United States Patent [19]
Sim et al.

[11] Patent Number: 5,771,553
[45] Date of Patent: Jun. 30, 1998

[54] PRECISION AND QUICK AFFIXING METHOD FOR FLEXIBLE AUTOMATED ASSEMBLY

[75] Inventors: Tian Soon Sim; Kah Bin Lim; Marcelo H. Ang, Jr., all of Singapore, Singapore

[73] Assignees: National University of Singapore; Nanyang Polytechnic, both of Singapore, Singapore

[21] Appl. No.: 720,767

[22] Filed: Oct. 3, 1996

[51] Int. Cl.⁶ .................................................. B23Q 17/00
[52] U.S. Cl. .......................... 29/407.09; 29/464; 29/701; 29/705
[58] Field of Search ............................ 29/407.01, 407.09, 29/407.1, 464, 701, 702, 703, 705, 771, 791; 364/150

[56] References Cited

U.S. PATENT DOCUMENTS 5,539,975   7/1996   Kukuljan et al. ........................ 29/701

OTHER PUBLICATIONS

J.J. Mills, B.L. Huff, T. Criswell and D.H. Liles, The Dynamically Reconfigurable Assembly System: Implementation Issues The Institution of Engineers, Australia 1993 International Conference on Assembly, Adelaide, 22–24 Nov. 1993, pp. 27–34.

Tian S. Sim et al. "'Lock & Free' Assembly Concept—An Effective Way to Aid Vertical Automated Assembly", The Third Industrial Automation Exhibition and Conference TS–02, Singapore, 1994, seven pages.

Tian S. Sim et al. "Compliant Eng'effector Coupling (CEEC)", The first Chinese World Congress on Intelligent Control and Intelligent Automation, Aug. 26–30, 1993, eight pages.

*Primary Examiner*—David P. Bryant
*Attorney, Agent, or Firm*—Birch, Stewart, Kolasch & Birch, LLP

[57] ABSTRACT

An error reduction and accommodation method and system can be used in an automated assembly environment. This method and system use a simple localized calibration process devised to improve similarity between an actual device and a simulated model when an off-line programming technique is used. The system uses grid-hole tables with modular fixtures holding the workpieces. The grid-hole table has round holes instead of screw holes or T-slots and allows modular fixtures with round pins to be placed on the grid-hole table with greater precision. A compliant coupling which is able to accommodate any small error in the system and when used with any end-tool, allows the assembly robot to carry out tasks within the modular system. The use of the grid-hole table and modular fixtures allows the robot, once taught the grid-hole table and the modular fixtures, to be subsequently programmed off-line to carry out any tasks with any standardized modular fixture placed any where on the grid-hole table. The modular fixtures easily slide into any selected grid-holes as required and may be used without further clamping or may be clamped to the grid-hole table, if so desired.

16 Claims, 7 Drawing Sheets

PRECISION AND QUICK AFFIXING METHOD FOR FLEXIBLE AUTOMATED ASSEMBLY

FIELD OF INVENTION

This invention relates to an error reduction and accommodation method for an automated assembly that adopts off-line programming techniques. The invention adopts a bolt-less affixing method to reduce affixing errors and makes use of an effective compliance device to accommodate the remaining undiminished errors. A simple localized calibration process is devised to improve the similarity between actual and simulated model when an off-line programming technique is applied. The invention is particularly suitable for a flexible automated assembly that has to cope with rapid product-and process-changes.

BACKGROUND OF THE INVENTION

Flexible assembly systems should be able to change over physical set-ups or workcell devices and assembly programs without significant production time loss. With the life cycles of most products in the market becoming shorter due to rapid advances in technology innovation, and strong demands from customers who are becoming increasingly insistent on high levels of product differentiation, the ability of companies to respond quickly to product changes and modifications will be a decisive factor in ensuring their competitiveness.

Many of today's automated or robotic assembly systems consist of custom-designed fixtures, parts feeders, magazines and other peripherals that are bolted rigidly into a flat robot table. These systems are inflexible for quick and cost-effective change-overs. A work-cell device should include traditional part-fixtures, or feeders and flexible affixing modules. Flexible affixing systems include programmable clamps, molten metal fixtures, mechatronic fixtures, and manually set-up modular fixture kits. Owing to its diverse classifications, a workcell device is sometimes referred to here as a fixture. These terms are used interchangeably.

Elimination of fixtures in an assembly system is one of the creative means to overcome affixing problem. There are vision assisted assembly systems that pick or assemble parts on a moving conveyor or a stationary workcell without a single fixture. There is yet another fixture-less system that employs a double arm robot as an assembly tool. This robot uses one of its arms to hold an affixing element and the other to carry an end-effector. Such fixture-less systems give flexibility, but their application is limited. Such systems become more expensive and complex if a turning action, such as a screw tightening process, is part of the assembly process.

For the robot to drive a screw into a part, the part must be held rigidly in position. There are flexible affixing systems in a laboratory setting that accommodate and provide necessary constraints for a variety of assembly parts with a single fixture. Gemcor Engineering Corp. developed a programmable or flexible fixture for holding a plurality of details comprising an assembly during assembly processes. Its details can be seen in the patent number EP 0277423 Al 880810 (SPELLER).

Automation & Robotics Research Institution of the University of Texas at Arlington has explored a new automated assembly concept called Dynamically Re-configurable Assembly System (DRAS). An article that reports the work done was published in 1993, in the International Conference on Assembly at Adelaide. In their work, a mobile process module that contains a work surface (table) is detachable from the robot workstation. To facilitate attachment and location of process equipment permanently or product hardware temporarily, the top of this work surface is equipped with a 3-inch pattern of tapped and through holes. Any process-specific or product-specific tooling designed for the cell conforms to this affixing convention. Tooling can be firmly bolted to its top. This mobile and detachable process module gives unwanted tilt upon installation. This requires a force controlled three-point calibration routine to determine the location, height and tilt of the installed work surface. The positions of all the other tooling holes are not calibrated and therefore must be accurately manufactured.

A T-slotted work surface is sometime used in training institutions for mounting of workcell elements. Use of threaded grid-holes or T-slotted work surface eases the set-up of workcell elements. However, they cannot ensure positional repeatability for the exchange of workcell elements due to the fact that they are not a precise locator. It is a common practice for system designers to specify a clearance of 0.5 mm to accommodate those fastening elements.

In terms of program flexibility, off-line programming systems are able to free the actual robot from being used in manual robot teaching. A typical robotic off-line programming package allows the user to model and optimize the workcell before its actual hardware implementation. The robot in the simulator should replace the actual manipulator in the teaching of location points. The simulator stores the location points trained in an output file with a standard format. The user can then make use of the simulator to generate a simple track file (consisting of robot motion commands, decision making statements, etc.), merge the point- and track-file and post-process them to a specific robotic language format. He or she can then edit the post-processed file to add more high-level instructions. This post processed file can eventually be down-loaded into a robot controller for subsequent usage. However, one can also employ an off-line system merely to generate points and use a generic or specific editor to generate the robot's instructions. This robot training method allows the robot to be uninterrupted thus boosting the program flexibility of the system. However, the progress of this flexible programming method is impeded by the discrepancy commonly found between the simulated and actual implemented workcell.

A particularly important factor in off-line programming is the inherent inaccuracies of most robots. On the contrary, in teach-programming, the robot's repeatability becomes a more important attribute relative to its accuracy when one maneuvers the robot arm manually to define new location points. The inaccuracy of robots is mainly due to manufacturing tolerances involved in the production of each robot. The two most significant sources of error are discrepancies in the robot link lengths and in the zero position of each joint. Beyond all these discrepancies are the dynamic problems associated with masses, torque and accelerations of the real robots. There are commercially available robot calibration systems that the present invention would only use readily as a tool. Upon a calibration, the accuracy of a robot will improve. Commercially available calibration systems for robot are categorized into optical or cable types. Some examples of the prior art may be seen in the following patent specifications number EP0549805 Al 930707 (WATANABE), WO 9305479 Al 930318, (Wang, Xuguang), EP 0616566 Al 940928 (SNELL) and EP 0533949 Al 930331 (TOUNAI).

A correctly calibrated robot's model will be able to represent the real robot faithfully, hence reduce the model dissimilarity in terms of the robot itself. However, there are still two other sources of model discrepancies within the set-up of the entire workcell that impedes the popular adoption of an off-line programming technique. First, conventional fixtures are secured to a robot table by screws, bolts or nuts. The provision of clearance holes for these mechanical fasteners deviates the location of actual robot and fixtures in a workcell from the software model. A good system designer will make use of round pins for location of the fixtures but will tend to bolt the fixtures down. A bolt-less affixing system is apparently a solution that minimizes affixing errors. Second, an end-tool that is attached to a robot extremity is usually accurately guided in terms of position (X,Y, and Z), but not the orientation. There should be an accurate alignment device that locks an end-tool both in terms of location and orientation. This makes exchange of end-tools a more repeatable process and also reduces the chance of making mistakes in the modeling of an end-tool.

In October 1995, the inventors presented an article in the 26 th International Symposium on Industrial Robots on the application of a passively-compliant coupling, the Compliant End-Effector Coupling (CEEC) that aids automated precision assembly. The usage of the CEEC actually led to the conceptualization of the present invention. In DRAS, a mobile work surface is titled after clamping. This problem is eliminated when a CEEC is used jointly with a fixed work surface. The CEEC serves as a mechanical interface between the end of the robot arm and the end-effector. The coupling has six degrees of freedom of movement. The design of the coupling is based on a "Lock & Free" assembly idea. The coupling is locked and behaves like a stiff member during robot motion and is free (compliant) during constrained motion. It features an air bearing, a variable stiffness airspring and a center-locking mechanism. Some of the features of the CEEC have been available since 1993. However, the present invention includes improvements of the CEEC. These improvements enable an automatic activation of the "FREE" routine. An optimized and timely activation of the "FREE" routine is extremely important because the end-tool is able to be drifted rather easily under the support of air bearing. Previously, the user must determine this height (Z) for this activation either analytically or manually.

OBJECT OF THE INVENTION

It is a primary object of the present invention to provide a flexible assembly cell for quick and accurate fixture changes. The invention should reduce accumulated affixing and assembly errors to less than 0.5 mm and recommend an error accommodator to ensure a successful flexible assembly.

It is another object of the present invention to provide a simplified method for a true off-line programming technique to be employed in a truly flexible assembly cell. This method should form a cheap and reliable means of workcell calibration that will reduce dissimilarity between a model and an actual device. There will therefore be many uses.

It is another further object of the present invention to emphasize an accurate means of exchanging the end tooling (end-effector) in a flexible assembly cell.

Other objectives, features and advantages of the present invention will become obvious from the detailed description which follows, or may be learned by practice of the invention.

SUMMARY OF THE INVENTION

A flat work surface that is equipped with a grid of equally spaced round location holes or tooling bushings is useful both in on- and off-line programmed robotic system. This grid-hole surface can be rigidly bolted onto a robot table. Each grid-hole surface can hold up to a few workcell elements. The design of the grid-hole surface can be custom-designed to suit a robot that has a small work area. Hence the plan view of such a grid-hole surface will be irregular in shape. In the case of a robot that possesses a large work area, a few standard rectangular grid-hole work surfaces may be installed around the robot.

Process equipment or part fixtures are built on top of a sub-base and are added into and removed from the grid-hole work surface via a standard affixing arrangement. Two tooling pins, one round and another one having a diamond shape are fixed on the bottom surface of this sub-base with a fixed gap between them. The round pin acts as the principal locator, whereas the diamond shaped pin serves as the secondary locator that prevents rotational movement for the sub-base about the principal locator. This diamond shaped pin can actually be replaced with yet another smaller round pin to prevent redundancy in location if both pins are of similar dimensions. The specification of diameter of the tooling pins and space between them are dictated by corresponding elements in the grid-hole surface.

Unlike conventional affixing techniques, a tight clearance fit of 0.02 mm between the principal locator and hole is attainable. This small clearance ensures repeatability in exchanging of fixtures. Under normal circumstances, fixtures are incorporated into the grid-hole surface by their own weight without the help of any mechanical fastener. However, tall fixtures may be further secured by an on/off magnetic sub-base. Round and diamond tooling pins are preferred to mechanical fasteners because they are commonly acknowledged as precision locators in the manufacture of jigs or fixtures. The user of this grid-hole surface who has manually trained the robot can now easily exchange fixtures without tedious set-up, and could re-use all the pre-taught points without redefining.

An off-line programming method is often used to boost the program flexibility in a flexible assembly system. The robot's arm in the simulated model should be preferably measured and calibrated against its actual counterpart with any commercially available calibration system. However this robot's calibration is not part of the present invention. It is used optionally to improve the accuracy of a particular robot. After a mechanical installation of a custom designed or a standard grid-hole surface, a localized calibration process should be able to determine and correct any model dissimilarity. Unlike the DRAS, the flatness and alignment of this grid-hole surface at this very stage is insignificant.

A localized calibration in the present invention concentrates in mapping the locations of the tooling holes between the software and hardware models. The axes of these locating holes in the simulated model are calibrated against the hardware counterparts. The programmer will manually bring the robot that carries a solid metallic conical plunger at its tool center point (TCP) to measure the position data (XYZθ) of all the location holes. The recorded data are compared with the corresponding ones in the software model. Any discrepancy found between models will be corrected in order to achieve precise mapping of the two models. After this localized workcell calibration, the simulated robot model with grid-hole surface is able to faithfully represent its real world model, thus reducing the errors due to model dissimilarity. This calibration is easy and cheap because an expensive, sophisticated auxiliary measuring system is not required.

An off-line programmer can now model the other workcell devices which include assembly parts, tools, and fixtures using the robot simulator. The programmer may choose to import these models from other drafting software. Any part holders or distributors that are either custom engineered or for general purpose should be placed on top of a sub-base before its introduction to the main grid-hole surface. This sub-base can also be universal in nature and will be equipped with a mini grid-hole surface that is portable and recyclable. In other words the grid-hole surface can be reused. It consists of several equally-spaced round holes or tooling bushings and can also be interlaced with tapped holes. These sub-bases vary in sizes (i.e. small, medium, and large), but they are designed to provide a quick and precise interface between parts fixtures and the main grid-hole surface via a pair of standard round and diamond locators. The round locator acts as the datum for any points of interest to the off-line programmer. The X-Y offsets between pick-up points within the fixture and the reference pin is the data that is useful to an off-line programmer. This data is used to guide the robot in the simulator to pick or place a part. The robot manufacturers should preferably provide the robot's extremity with suitable interface schemes that are able to ensure accurate and repeatable end-tool installation. This is needed to minimize the error in tool changing.

A compliant tool, the CEEC that was developed to accommodate assembly errors is used here to complement the fixturing concept by accommodating the remaining uncontrolled errors. This passive compliant coupling operates on an air bearing concept, is lockable, and has zero lateral stiffness when activated. It works well with parts that are provided with chamfers or lead-ins. For automatic installation or removal of fixtures, the CEEC should be used to aid the exchanging process. An alternative compliance tool that can be purchased off the selves may also serve this purpose.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS.

The accompanying drawings which are incorporated into and constitute a part of the description of the invention, illustrate embodiments of the invention and serve to explain the principles of the invention. It is to be understood, however, that the drawings are designed for purposes of illustration only, and not as a definition of the limits of the invention for which reference should be made to the claims appearing at the end of the description.

DESCRIPTION OF THE EMBODIMENTS OF THE INVENTION.

Figure 1A:
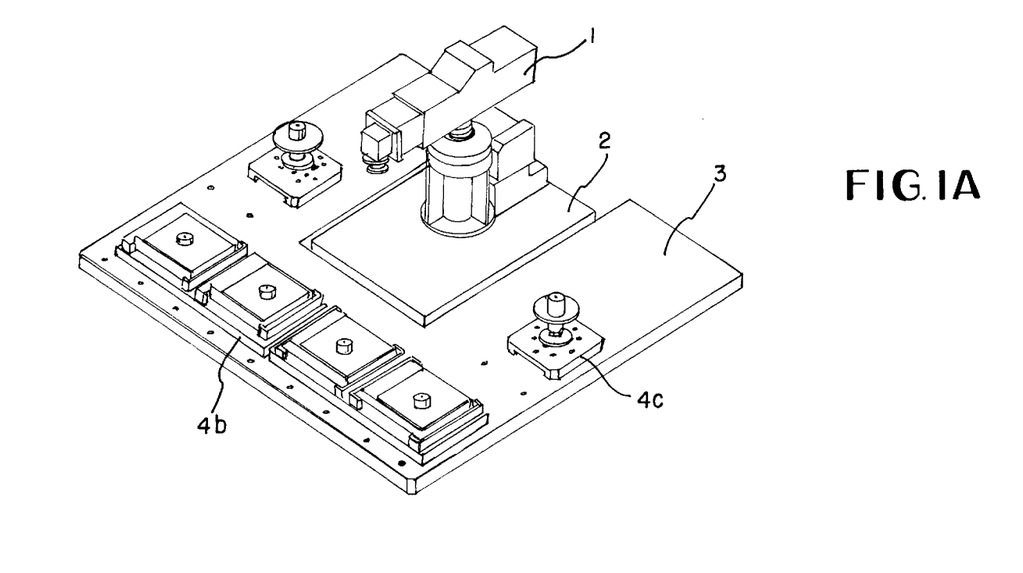
FIG. 1A is a full isometric view of a particular robotic workcell that is installed with the grid-hole surface of the present invention.

Referring in detail to the drawings, and with particular reference to FIG. 1A, one embodiment of the present invention is shown. Part fixtures such as parts stand, parts tray, parts magazine and parts feeders can be custom designed, manufactured and assembled in a fixture room. A typical industrial robot's manipulator indicated by reference number 1 should be firmly bolted onto a heavy and steady base 2. Base 2 is commonly constructed through fabricating a carbon steel box or table primarily using welding technology. The grid-hole surface 3 forms the universal table that sits securely on the base 2 by mechanical means. Grid-hole surface 3 has plain holes for location pins. In other words, the holes have a uniform diameter. The grid-holes are precisely and equally spaced. All location holes must be drilled and reamed and maintained at an uniform size.

Since the efficiency of the exchanges of the fixtures is a function of quality of holes, it is vitally important that the holes are hard, precise and smooth. Carbon steel that can be case hardened is the required material of grid-hole surface 3. Alternatively, an aluminum alloy which is highly machinable can be used to replace the steel which is relatively heavier and more difficult to machine. Standard steel bushings that are hardened should be press-fitted to the aluminum alloy table to yield holes with high wear resistance and tenacity. These bushings are commercially available in a few versions. Owing to the use of different robotic systems, robot manufacturers or end-users are to determine the actual design of the grid-hole surface 3.

Figure 1B:
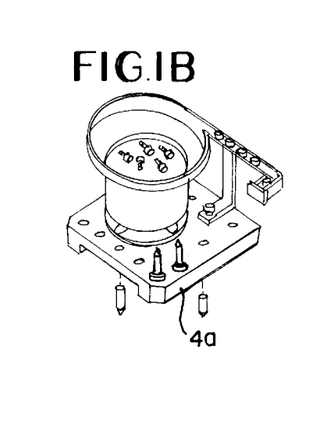
FIGS. 1B, 1C and 1D show the three possible types of parts fixtures that can be installed into the main grid-hole surface.
Figure 1C:
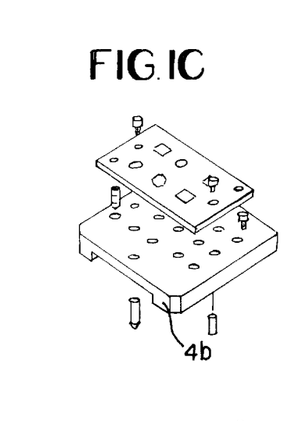
Figure 1D:
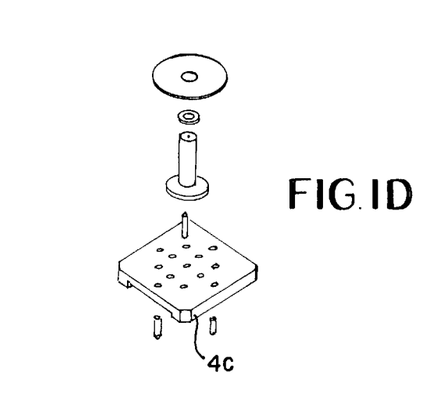

A few standard rectangular grid-hole surfaces 3 can be installed around a robot that has a large work area. A variety of fixtures can be added to or removed from the grid-hole surface 3 through a sub-base that carries a pair of location pins. Sub-base 4a in FIG. 1B shows a large sub-base that is able to contain a bowl feeder system with screws in it. Sub-base 4b in FIG. 1C shows a type of the part pallets that can be incorporated onto a medium sub-base. FIG. 1D shows a small sub-base 4c that can be used to interface between a simple part-stand and the grid-holes base 3. All the sub-bases regardless of their sizes have a similar construction.

Figure 2A:
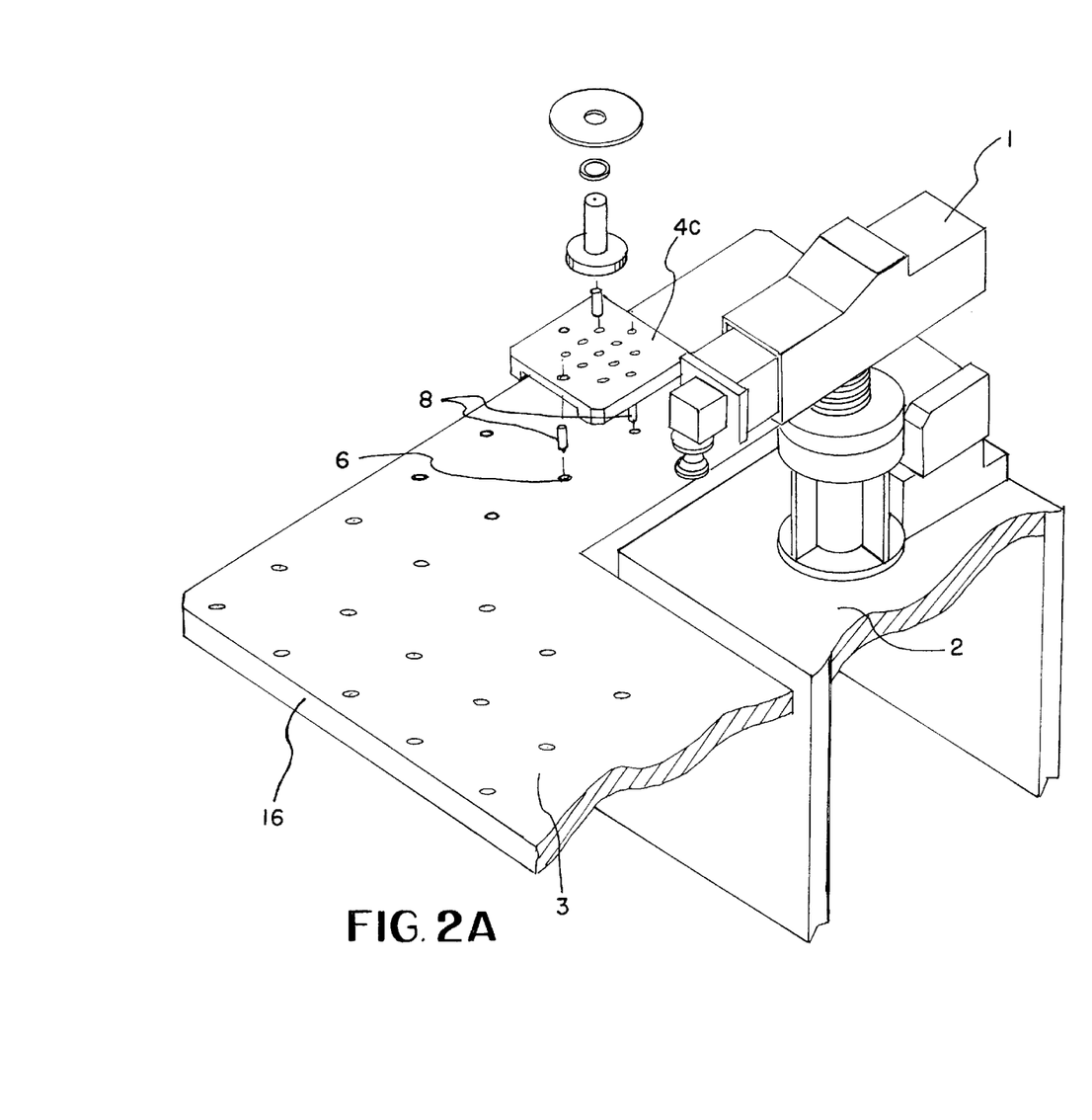
FIG. 2A is a sectional isometric view of FIG. 1A.
Figure 2B:
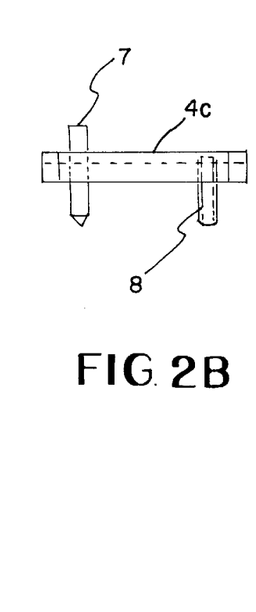
FIG. 2B shows an enlarged view an assembly drawing of a particular part holder with its sub-base of FIG. 2A.

In FIG. 2B, a round pin 7 and a diamond shaped pin 8 constitute the location system for the sub-base 4c. This location method is recommended by manufacturers of jigs and fixtures as a practical location system that avoids redundancy. Pin 7 is precise and hardened and serves as the principal locator. In FIG. 2A, holes 6 in the grid hole base 3 constrain translational movement of sub-base 4c via pin 7. The diamond pin 8, on the other hand, acts as the second locator that prevents rotation of sub-base 4c about the axis of pin 7 after the complete fixture with sub-base 4c is inserted into two adjacent holes 6. Both pins 7 and 8 are commercially available as tooling pins.

Figure 3:
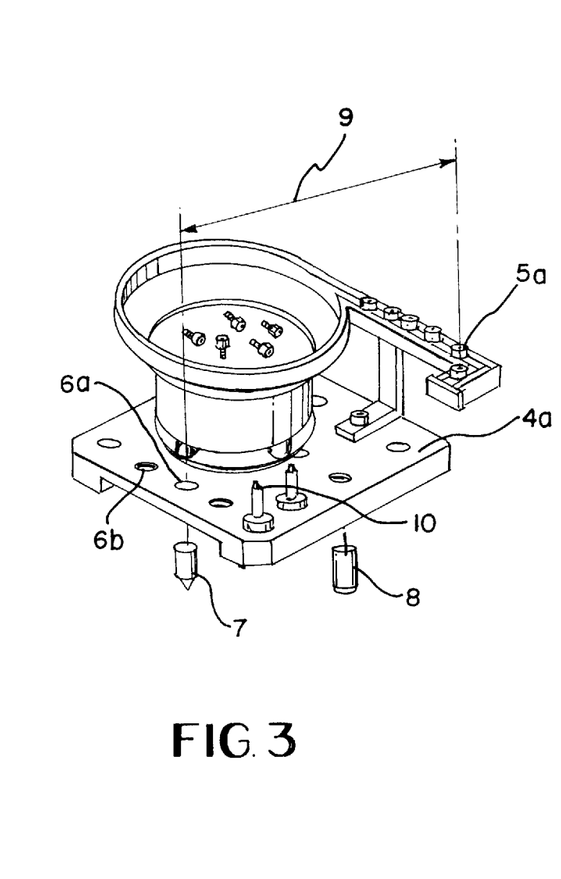
FIG. 3 is a perspective view of a bowl feeding system that is incorporated onto a sub-base.

FIG. 3 illustrates a bigger view of sub-base 4a. The choice of the material and fabrication methods for sub-base 4a is similar to those associated with the grid-hole surface 3. The sub-base 4a can be custom-designed with dedicated holes specified to secure a dedicated fixture. However, a universal sub-base 4a is preferred for recycling purposes. A universal sub-base typically consists of a number of precisely and equally spaced plain holes 6a and tapped holes 6b. A universal sub-base having only plain holes 6a is suitable for a fixture that does not require screw tightening. The principal locator 7 and the diamond locator 8 are precisely press-fitted into sub-base 4a via location holes 6a.

Fixtures or feeders are installed either temporary or permanently onto the sub-bases 4a via round pins or screws, respectively. In FIG. 3, the distance 9 of pick-up point of part 5a (a screw) from locator 7 must be measured and expressed in terms of X–Y offsets. This data must be recorded for the off-line programmer to model the pick-up points in the simulator. The measurement may be accomplished by using a coordinate measuring machine or any manual methods. Optional measuring post 10 can be inserted to any of those plain holes to facilitate manual measurements. When no screw is used, the distance 9 in terms of X-Y offsets can be obtained directly from the design data. Usage of screws to set-up a fixture or feeder warrants a measurement of distance 9 before implementing it onto grid-hole surface 3. There are two contributing error factors. First, tapped holes in the sub-bases are not precise locators. Second, holes for screws in a fixture body require clearances of typically 0.5 mm to accommodate misalignments. This provision adds uncertainty to the distance 9.

Figure 4:
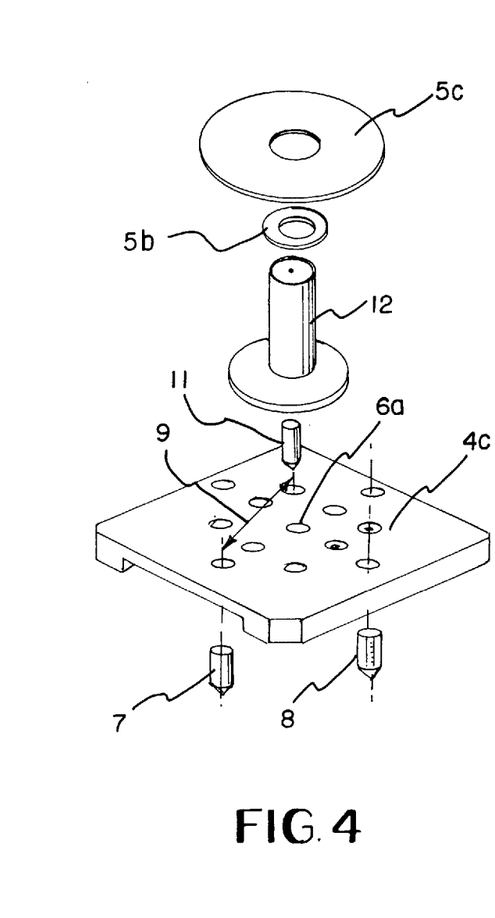
FIG. 4 is an exploded perspective view of a part holder system that sits on top of a sub-base.

FIG. 4 shows a typical part holder 12 for parts 5b (a spacer) and 5c (a disk). A precise, hardened round pin 11 is press-fitted onto holder 12. Complete assembly of holder 12 is in turn fitted into a plain hole 6a that possesses a sliding clearance of typically 0.03 mm. In this example, the distance 9 is the designed linear offset between the reference pin 7 and the center of the hole 6a. If the sub-base 4c is fabricated according to the designer's specifications, the distance 9 is a known design data with a small error of 0.03 mm. However, in certain cases where screws are used together with tooling pins, the design data can still be employed readily in off-line programming without pre-installation measurements. In FIG. 1C, with fixture assembly 4b, screws are used for securing the workcell device that was properly located by tooling pins.

In a robotic assembly workcell, the grid-hole surface 3 is able to accommodate a few workcell devices (fixtures or feeders) that sit on top of their respective sub-bases. The workcell devices sit securely in place either by their very own weight or with the help of an on/off magnet that can be incorporated onto the sub-bases. These fixtures are to be transported to the workcell from an automated warehouse via perhaps an automated guided vehicle. They can be reconfigured or rearranged flexibly either by a human, a robot or dedicated device built into the assembly system. Once all the required fixtures are in place, the location points can be defined manually or by using off-line techniques.

In the manual teaching method, a robot programmer will lead or guide the robot to the desired destinations by obeying instructions laid down by the particular manufacturers. With the grid-hole surface in place, the workcell device can be removed from the grid-hole surface 3 and can be re-installed to the same grid-holes without a need of redefining the teaching points. This reduces non-productive time such as reinstallation or setting-up time between batches for assembly of multiple products.

An off-line approach to teaching a robotic system involves designing a robot and its associated fixtures using a computer. The robot's controller must be able to communicate with a computer via the RS 232 protocol or any other means of interface. The computer must be equipped with at least a copy of 3-D robot simulation and off-line programming software package or in short "robot's simulator". This package is commercially available in many versions with various features. Users can improvise and enhance the performance of the purchased package's to suit their specific needs. Alternatively, users may want to develop this type of software tool entirely by themselves.

An off-line programmer will first develop the model of the particular robot's manipulator, its end-tool, its fixtures or feeder layout interactively using the robot's simulator and then define the robot's instructions and points in the simulator. Hence, the actual robot's manipulator will be free to perform continues and uninterrupted productive tasks. The acceptance of this ideal robot programming method is impeded by the problem of models dissimilarity. The actual implemented workcell differs slightly from the software counterparts.

The grid-hole surface 3 after a localized calibration is able to reduce the errors due to dissimilar models. Before an actual calibration a software model that represents an actual layout of the installed grid-hole surface 3 and the particular robot's manipulator 1 is developed. This forms the basic software workcell. A programmer may obtain the geometrical data of the manipulator and the grid-hole surface 3 from the manufacturer and the system's designer, respectively. Owing to the standardization of data exchange, some robot simulators provide direct graphic (2D or 3D) importing and exporting facilities with other computer-aided design packages. These facilities accelerate the modeling process by avoiding unnecessary repetitions.

The robot's manipulator acts as the measuring tool in this localized calibration that covers a limited planar surface of the grid-hole surface 3. This planar calibration is termed here as a "workcell calibration". Improvement of robot's accuracy by other robot's calibration methods is beneficial but is not an absolute necessity. A simple round metallic plunger that is attached to the robot's manipulator functions as the measuring probe. Nonetheless other commercially available measuring probes are possible alternative measuring tools.

Figure 5:
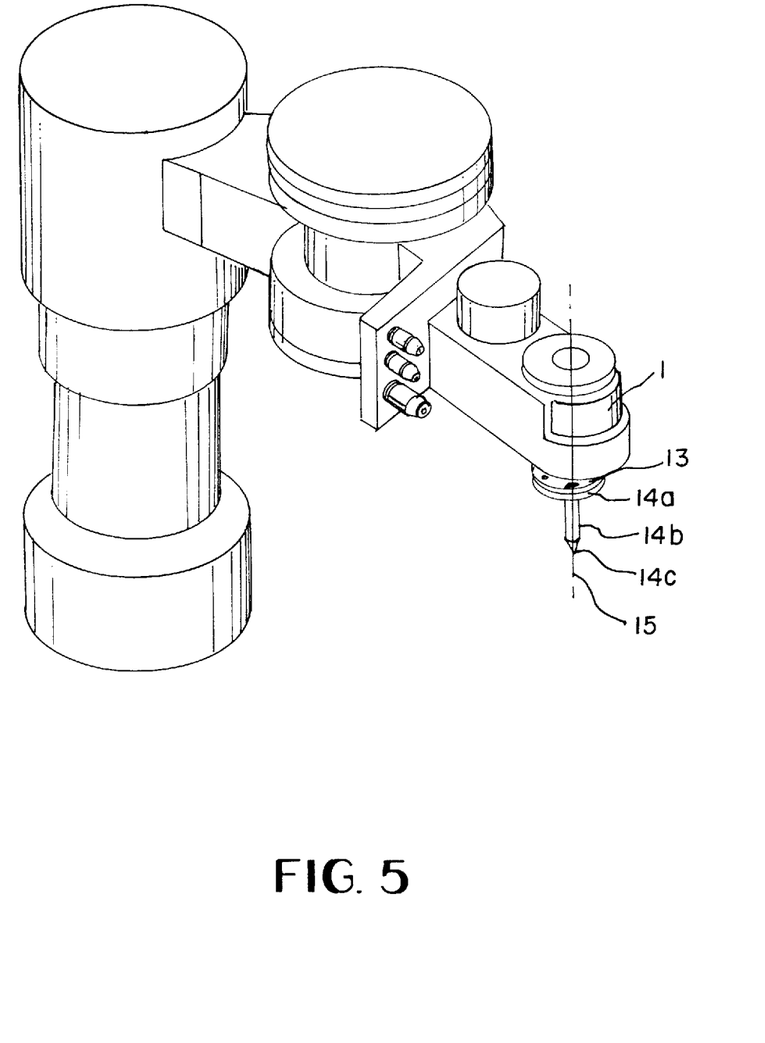
FIG. 5 is a perspective view of a particular robot that carries a conical plunger at its tool center point.

A particular robot's manipulator represented by reference number 1 in FIG. 5 carries a mechanical plunger 14 at the axis of tool center point(TCP) 15. The plunger 14 in this example is made of hardened steel and has two round steps 14a and 14b with a conical tip 14c. A round flange 14a is the primary step and is designed specifically to interface with a robot end shaft 13. The design of the flange 14a is dependent on the manufacturer's specifications of their robot end shaft 1314. The system designers must ensure that the location and fastening system employed is able to align the center of the plunger 14 to the TCP 15. The plunger main body 14b is the secondary step and is parallel and collinear to the TCP 15. The nominal diameters of plunger 14b and the grid-bolt 6 are the same, however the tolerances of plunger 14b should be designed such that it slides within a small clearance inside the grid-holes 6.

The plunger 14b must be correctly represented in the robot's simulator before the workcell calibration. The programmer starts the calibration by manually maneuvering the actual robot in order to insert the plunger 14b into one of the grid-holes 6 within the installed grid-hole surface 3. A good alignment of the axes of plunger 14b and the grid-hole 6 results in a good insertion. Upon a satisfactory insertion, the current coordinate values in terms of X, Y, Z and v of a 4-axis robot are recorded. This recorded data of the measured hole is compared with the corresponding data in the software model. For an actual mapping of the two holes, the programmer will adjust the location of the corresponding hole in the simulator to eliminate discrepancy found between them. The programmer will perform these measuring and correcting actions repeatedly for the remaining grid-holes 6. Then, all the holes 6 in the simulated model faithfully represent the actual holes 6 in the grid-hole surface 3. All the center axes of the holes 6 become the reference axes for future fixtures after the localized calibration.

It is recommended that the programmer calibrates the positional accuracy of the entire grid-hole surface 3 before the detailed calibration of every location holes. If the grid-hole surface 3 is manufactured accordingly, the discrepancy found between the grid-holes of actual and simulated model will be minimum. In a calibration of the entire grid-hole surface 3, the programmer moves the plunger tip 14c to two extreme points of an edge 16 shown in FIG. 2. The coordinates of these two points are used to calibrate the corresponding points found in the simulated model. This process can be repeated for two other adjacent edges. It is not essential if the edges of the grid-hole surface 3 do not serve as references design of the entire work surface. In the case of an axis of a hole being used as the design reference, this particular hole must be calibrated first. Next, the hole located at the top left hand corner is calibrated and the calibration of the entire work surface is completed when the hole situated at the top right hand corner is calibrated. This preliminary three-point calibration eliminates initial model dissimilarity. The calibration of all other existing holes removes uncertainty about their accuracy in terms of model similarity.

The workcell calibration of the basic software model (the robot and grid-hole surface 3) can be either performed at the particular robot's manufacturing plant or of the users'site. A correctly calibrated workcell sets the foundation for programmers to continue with modeling of other fixtures. A simple workcell device as shown in FIG. 4 can be modeled by the robot simulator. One can model the sub-base 4c and store it in a library for future retrievals and usage. Part-stand 12 and pin 11 are modeled as an integral entity. Assembly parts 5b (spacer) and 5c (disk) are modeled separately as discrete entities and loaded into the part-stand 12 which in turns sit on top of sub-base 4c. The complete assembly of FIG. 4 is incorporated onto the grid-hole surface 3 through mating a pair of pins 7 and 8 with a pair of the grid-holes 6. Since a robot's simulator is a 3-D modeler, a user can focus on the alignment of pin 7 and hole 6 while maintaining a correct orientation of the sub-base 4c such that pin 8 can enter another hole 6. Once the part-stand 12 is accurately located onto grid-hole surface 3, the programmer can instruct the robot to pick up either part 5b or 5c by visual examination. The different perspectives that a robot's simulator usually offer will provide the programmer an accurate visual realism of the location of parts while attempting handling actions. The distance 9 being an important data is embedded in the model of sub-base 4c, hence it is transparent to the programmer.

However there is another programming method that makes use of the distance 9 to instruct the robot to pick up an object especially if the gripper is centered at the TCP. The robot with its grippers moves to the center of reference pin 7 and offsets itself by a distance 9. This direct key-in method results in a quick alignment of the grippers and the parts. Part-stand 12 can also be introduced into the grid-hole surface 3 without the sub-base 4c. One has to insert pin 11 of the part-stand 12 into any of the grid-holes 6 of grid-hole surface 3.

Fasteners, such as screws, should be used selectively in the process of incorporating of fixtures onto the sub-bases. Usage of screws is inevitable in the case of bowl feeding system, for example, as shown in FIG. 3. The off-line programmer will first obtain a pre-installation measurement of the distance 9 and record it for modeling purpose. In the model construction, a simplified fixture system should illustrate the sub-base 4a with pins 7 and 8 including the part 5a (screw) properly supported and located with an off-set of distance 9 from the reference pin 7. The programmer may abandon the design details of the bowl feeder and the linear track which can be represented by a cylinder and an elongated-box, respectively. For teaching the pick-up point of part 5a, both visual and direct key-in methods can be used.

The grid-hole surface 3 is able to minimize model dissimilarity due to actual implementation of fixtures by emphasizing pin or bolt-less affixing concept. Nevertheless, there are still three sources of errors that lead to the robot's inability to accomplish assembly task programmed using off-line method.

First, the accuracy of all the reference points or the grid-holes 6 relies on the skill of the robot's trainers, therefore a small error, for example, 0.1 mm, is inevitable.

Second, the robot's manipulator is physically moved to define all the fixtures' references which are the center axes of holes 6. A highly repeatable robotics system is therefore crucial here. Typically, a particular industrial robot has a repeatability of ±0.025 mm. This repeatability contributes to the next formation of positional error. However, it is better to precalibrate the robot to enhance its accuracy in cases where the robot must move far from the fixture references following inputs from computed coordinates.

Figure 7A:
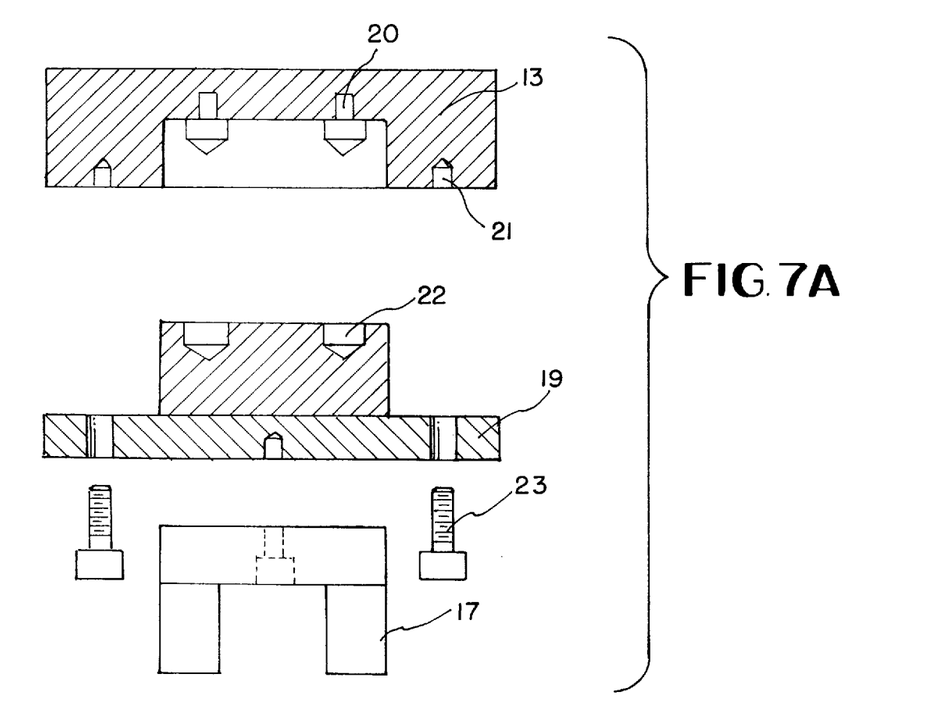
FIGS. 7A and 7B are cross-sectional views of another kind of robot's end-shaft modification, and its end-tool interfacing system, respectively.
Figure 7B:
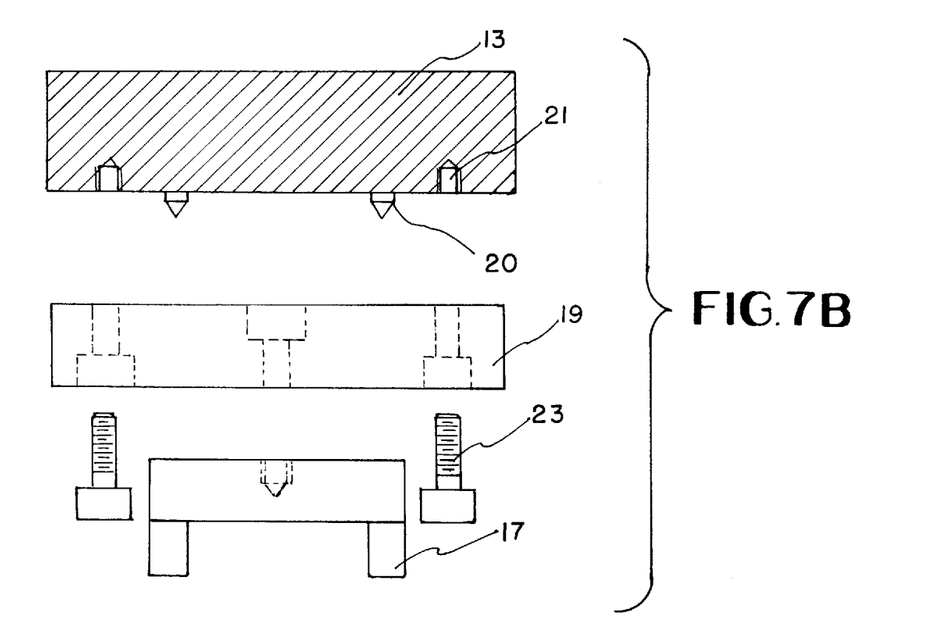

Third, most of the commercially available assembly robots are equipped with end-flanges that connect and constrain the end-tools in three traditional movement. The rotational movement of an end-tool ought to be confined to ensure a repeatable and precise change-over of the tool. This is an essential requirement because full compliance permits a flexible tool change without redefinition of location points. Some manufacturers of robot's accessories provide standard quick automatic tool-changers. Such automatic tool-changers should be used extensively here. In cases where the end-tool is manually changed. FIGS. 7A and 7B show two possible mechanical interfaces. They both require the tool-interface 19 to be first located by two tooling pins 20 and subsequently secured by screws 23. The end-tool 17 can then be installed to the robot's end-shaft 13 via the tool-interface 19.

Figure 8:
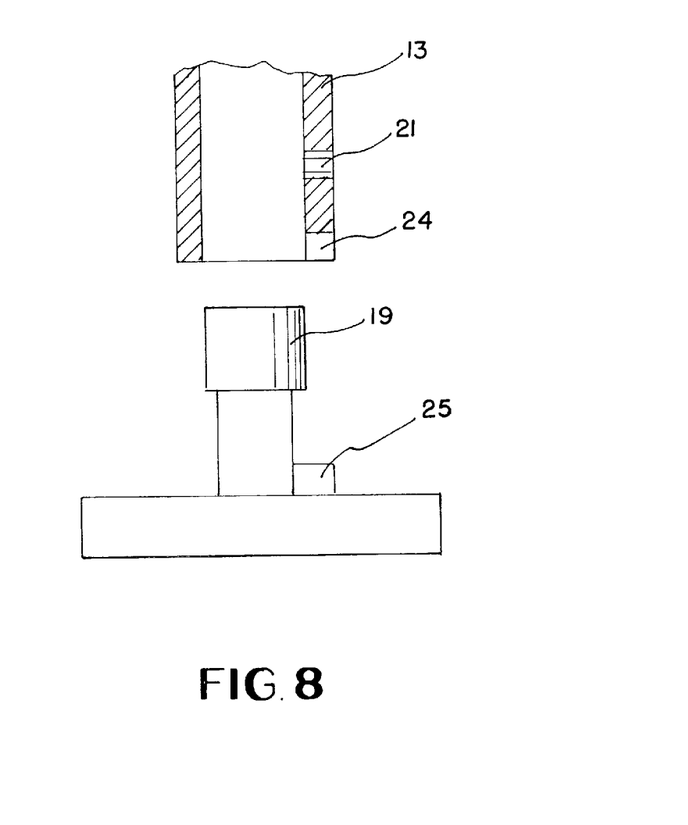
FIG. 8 is a cross-sectional view of a particular robot's end-shaft modification and its associated end-tool interim with a mechanical lid in the interface acting as an orientation locator.

FIG. 8 shows another example of a modification for a particular robot's end-shaft 13 that is believed to be another possible solution that one may consider. This slot 24 is the orientation locator for the tool-interface 19. When tool-interface 19 is precisely inserted into end-shaft 13, slot 24 will confine the lid 25, and hence prevent rotation of the tool interface 19. A screw can be tighten via tapped hole 21 to prevent the tool-interface 19 and its tool from disengaging from the robot.

Figure 6:
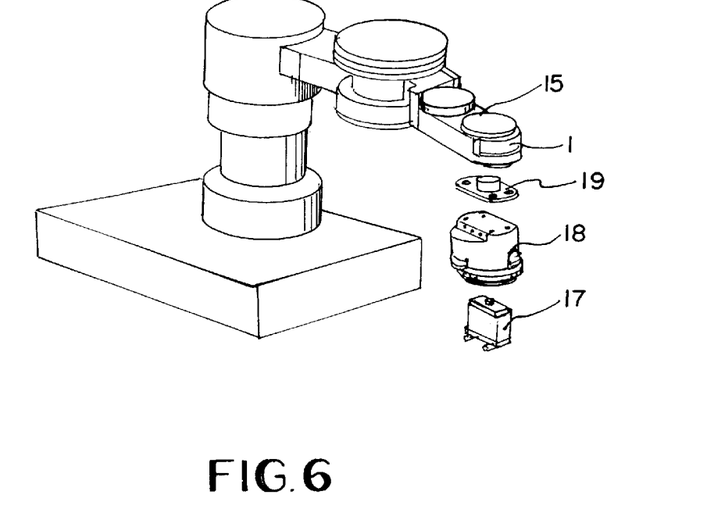
FIG. 6 is an exploded view of a robot's end-effector system showing a compliant coupling interfaced between an industrial gripper and the manipulator.
Figure 9A:
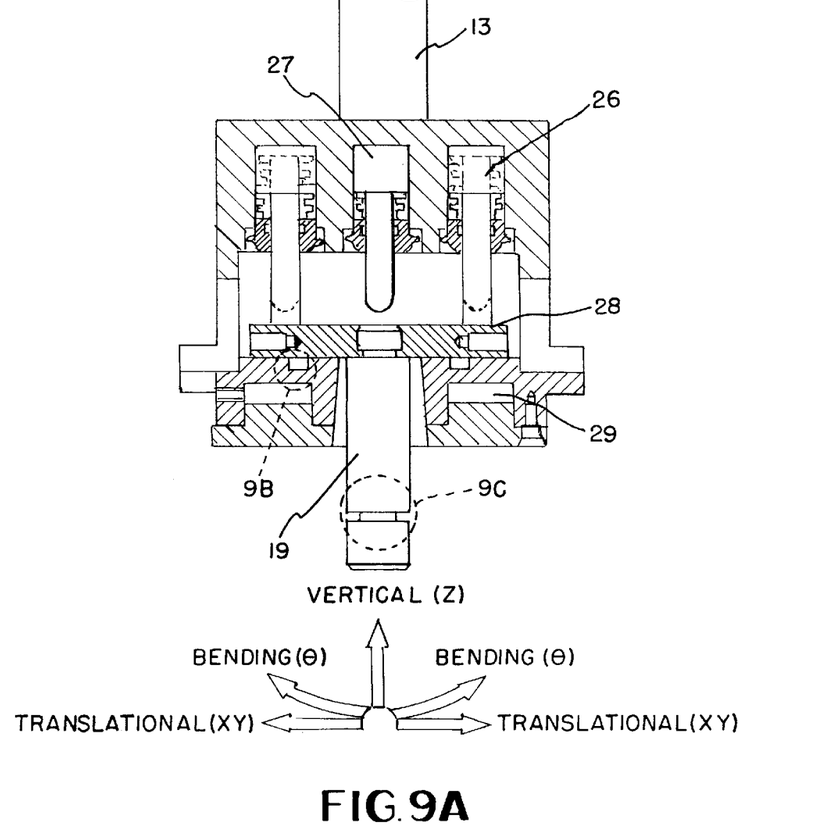
FIG. 9A shows a schematic of the compliant end-effector coupling (CEEC).
Figure 9B:
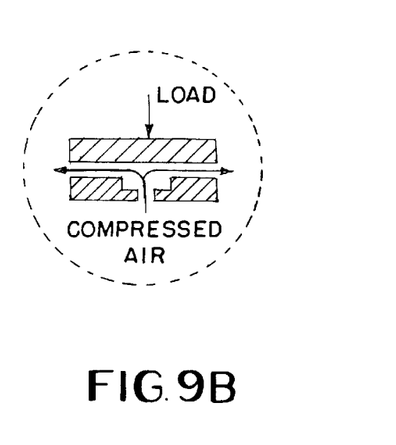
FIG. 9B shows an enlarged view of the air bearing concept.

The accumulated remaining errors that are persistent are predicted to be small (less than 0.5 mm) in magnitude. A compliant tool 18 (the CEEC) as shown in FIG. 6 was developed to complement the fixturing concept by accommodating the remaining errors. The CEEC 18 shown in FIG. 9A operates on an air bearing concept illustrated in FIG. 9B. The CEEC 18 is lockable by the center returning with locking mechanism 26, and has zero lateral stiffness when activated. The end-tool assembly 28 being centrally unlocked will float within the designed compliance limits assisted by the air cushion delivered by the air bearing chamber 29. These frictionless and free conditions facilitate a fast correction of any initial lateral and angular misalignments. In a peg insertion assembly, such accommodation is possible provided that the tip of the peg is contained within the chamfer of the hole. A variable stiffness air-spring 27 is incorporated in the design to provide a variable assembly force.

Figure 9C:
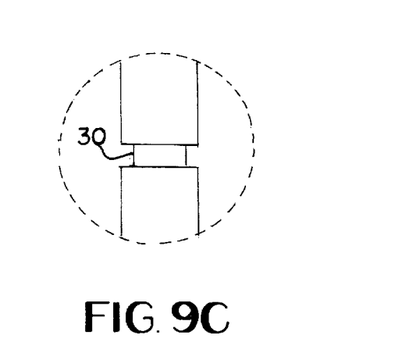
FIG. 9C shows a load cell from the tool-interface of FIG. 9A.

An assembly process generally constitutes a chamfer crossing and an insertion process. All assembly part being assembled with the help of the CEEC 18 must complete the chamfer crossing before the insertion. A new CEEC will feature an automatic activation of free routine upon acknowledgment of feedback reaction force during chamfer crossing. The instrumented CEEC 18 comes equipped with a standard force sensor or load cell 30 as shown in FIG. 9C. The load cell 30 will energize the air-bearing and unlock the locking mechanism 26 when a sudden force is felt during the chamfer crossing. Other commercially available compliance tools that can be purchased off the shelves may also serve the above-mentioned purpose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A system for handling a workpiece comprising:
   a grid-hole surface having a plurality of uniformly spaced holes;
   at least one sub-base;
   means for detachably mounting the sub-base to the grid-hole surface, the means for mounting including at least one pin extending from an underside of the sub-base, the pin being slidable into one of the holes on the grid-hole surface to thereby detachably mount the sub-base to the grid-hole surface;
   a device which interacts with at least one workpiece on the sub-base, the device being movable toward and away from the workpiece on the sub-base, the grid-hole surface at least partially surrounding the device;
   control means for automatically controlling movement of the device toward and away from the workpiece; and
   programming means for instructing the control means about moving toward and away from the workpiece on the sub-base, the programming means including an off-line programming system for modeling positioning of the workpiece on the sub-base relative to a fixed location and wherein the means for mounting precisely locates the sub-base such that deviations between modeling positioning during the off-line programming and an actual positioning of the workpiece and fixed location are minimized.

2. The system as recited in claim 1, wherein the device is a robotic manipulator movable toward and away from the workpiece on the sub-base, the manipulator being at least one of reciprocally, pivotally and rotationally movable relative to the workpiece.

3. The system as recited in claim 1, wherein the workpiece is detachably mounted on the sub-base and is moved by the device after the device moves toward and engages the workpiece.

4. The system as recited in claim 1, wherein the workpiece is fixed to the sub-base.

5. The system as recited in claim 1, wherein at least one pin of the means for detachably mounting comprises a plurality of pins extending from an underside of the sub-base to provide for bolt-less attachment of the sub-base to the grid-hole surface, one of the pins on the sub-base being a generally round pin and another of the pins being a diamond shaped pin, both the round pin and the diamond shaped pin being insertable into separate holes on the grid-hole surface.

6. The system as recited in claim 5, wherein weight on the sub-base and any workpiece thereon secures the sub-base to the grid-hole surface along with the pins inserted into the holes on the grid-hole surface.

7. The system as recited in claim 1, wherein the plurality of holes in the grid-hole surface are either tapped holes or plain holes and wherein the round pin is insertable into one of the plain holes and the diamond shaped pin is insertable in another of the plain holes.

8. The system as recited in claim 1, wherein the at least one sub-base has a plurality of holes for receiving at least one fixture holding one or more workpieces, the holes in the sub-base being used by the programming means as positional references for the workpiece.

9. The system as recited in claim 8, wherein the device includes a robotic manipulator with a plunger having a tip, the robotic manipulator being movable whereby the tip of the plunger is sequentially insertable and removable from the holes in the grid hole surface, the tip of the plunger and the plurality of holes having similar diameters with the diameters of the holes being only slightly larger than the diameter of the plunger whereby the plunger is slidably fit into the holes with a close tolerance, the plunger being inserted in at least some of the holes in the grid hole surface when the programming means calibrates positioning.

10. The system as recited in claim 9, wherein the tip of the plunger has a round conical end and is attached at a tool center point to the robotic manipulator.

11. The system as recited in claim 9, wherein the robotic manipulator includes an exchangeable end-tool at one end thereof, the end-tool being detachably mounted to the end of the manipulator.

12. The system as recited in claim 1, further comprising an energizable magnet provided for aiding in attachment of the sub-base to the grid-hole surface, the magnet being provided on the sub-base.

13. The system as recited in claim 1, wherein the device includes a robotic manipulator and wherein the system further comprises a contact monitoring sensor, an air bearing and a locking mechanism, the robotic manipulator being movable at least toward and away from the workpiece and wherein the contact monitoring sensor activates the air bearing when the manipulator is sensed to contact an item during movement, activation of the air bearing unlocks the locking mechanism to thereby lock the locking mechanism to stop movement of the robotic manipulator.

14. A method for handling a workpiece comprising the steps of;

provi ding a grid-hole surface with a plurality of uniformly spaced holes;

detachably mounting a sub-base to the grid-hole surface;

the step of detachably mounting comprising inserting at least one pin on an underside of the sub-base into one of the holes on the grid-hole surface;

providing a workpiece on the sub-base;

moving a robotic manipulator toward the workpiece on the sub-base;

engaging the workpiece with a portion of the robotic manipulator;

programming the robotic manipulator to automatically move toward the workpiece prior to the step of moving, the step of programming comprising modeling a position of the workpiece on the sub-base relative to a fixed location by using an off-line programming system; and precisely locating the sub-base on the grid-hole surface whereby deviation between actual positioning of the workpiece and a modeled position of the workpiece is minimized.

15. The method as recited in claim 14, wherein the sub-base has a plurality of pins on the underside thereof, the pins including a generally round pin and another diamond shaped pin and wherein the inserting in the step of detachably mounting includes sliding both the round pin and the diamond shaped pin into holes in the grid-hole surface whereby the sub-base is mounted to the grid-hole surface by a boltless attachment.

16. The method as recited in claim 14, wherein the step of moving a robotic manipulator toward the workpiece on the sub-base comprises at least one of the steps of reciprocating, pivoting and rotating the robotic manipulator relative to the workpiece.

* * * * *